(12) United States Patent
Huth

(10) Patent No.: US 7,073,803 B2
(45) Date of Patent: Jul. 11, 2006

(54) SUSPENSION SYSTEM, IN PARTICULAR FOR A WORKING MACHINE

(75) Inventor: Heinz-Peter Huth, Überhern (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 139 days.

(21) Appl. No.: 10/467,628

(22) PCT Filed: Feb. 13, 2002

(86) PCT No.: PCT/EP02/01468

§ 371 (c)(1),
(2), (4) Date: Aug. 8, 2003

(87) PCT Pub. No.: WO02/064387

PCT Pub. Date: Aug. 22, 2002

(65) Prior Publication Data

US 2004/0217566 A1  Nov. 4, 2004

(30) Foreign Application Priority Data

Feb. 14, 2001 (DE) .................................. 101 06 706

(51) Int. Cl.
*B60G 17/04* (2006.01)
(52) U.S. Cl. ............................ 280/124.159; 267/64.12; 267/64.28; 280/124.161; 280/754; 280/755
(58) Field of Classification Search ................ 280/754, 280/755, 124.159, 124.158, 124.161, 6.153, 280/6.155, 6.157, 6.159, 5.501, 5.514; 267/64.12, 267/64.28; 188/300
See application file for complete search history.

(56) References Cited

U.S. PATENT DOCUMENTS

| | | | | |
|---|---|---|---|---|
| 4,170,279 A | * | 10/1979 | Pelletier | 188/300 |
| 5,813,697 A | | 9/1998 | Bargenquast et al. | |
| 6,820,877 B1 | * | 11/2004 | Ichimura et al. | 280/124.159 |
| 2002/0109400 A1 | * | 8/2002 | Huth | 303/22.5 |

FOREIGN PATENT DOCUMENTS

| | | |
|---|---|---|
| DE | 2023283 | 11/1970 |
| DE | 4127917 | 2/1993 |
| DE | 42 42 448 C1 | 3/1994 |
| DE | 4235264 | 4/1994 |
| EP | 0517546 | 12/1992 |
| EP | 0867315 | 9/1998 |

* cited by examiner

*Primary Examiner*—Eric Culbreth
(74) *Attorney, Agent, or Firm*—Roylance, Abrams, Berdo & Goodman, L.L.P.

(57) ABSTRACT

A suspension system, in particular for a working machine, such as a tractor or similar device, with a suspension cylinder (10) is subjected to various load pressures (m). The piston slide (12) and rod side (14) of the system may each be connected to a suspension reservoir (16, 18). A locking device (20) locks the suspension and, with an equalization device (28) having a switching valve (48) within the supply device, controls the piston side (12) of the suspension cylinder (10). A pressure supply (P) supplies the system pressure necessary for the suspension system. A pressure equalization of the system to the relevant load pressure can be performed before renewed operation by the equalization device. The equalization device (28) includes a further switching valve (50) within the supply device (30) for control of the rod side (14) of the suspension cylinder (10). A load monitoring device (LS) is connected to parts of the stop device (20). The associated suspension reservoir (16) for the piston side (12) of the suspension cylinder (10) is in a branch (38) of a line (40).

9 Claims, 2 Drawing Sheets

SUSPENSION SYSTEM, IN PARTICULAR FOR A WORKING MACHINE

FIELD OF THE INVENTION

The present invention relates to a suspension system, in particular for a working machine such as a tractor or the like, with a suspension cylinder to which varying load pressures may be applied. A suspension cylinder whose piston and rod side may each be connected as required to a suspension reservoir by a locking device which locks the spring suspension system. An equalization device, having a switching valve, controls the piston side of the suspension cylinder inside the supply device. A pressure supply provides the system pressure needed in the suspension system.

BACKGROUND OF THE INVENTION

In certain spring suspension systems, for example for machines such as tractors or the like, it may be advisable to stop such machines, for example, at a speed below an assignable speed of the machine. This stopping is accomplished by locking the hydropneumatic suspension when the vehicle is moving at low speeds or is stationary. Operations, such as hoisting and loading and unloading loads or activation of harvesting or other implements, may accordingly proceed without disruptive vehicle spring suspension travel.

Since the load situation is unknown after such operations as the vehicle continues in movement or starts movement, in the conventional spring suspension systems movement of the vehicle or operating machine is not controlled when the suspension is unlocked. This lack of control is in principle an unacceptable situation.

DE-A-2 023 283 discloses a generic spring suspension system for a machine, such as a construction site vehicle, having two suspension cylinders to which different load pressures may be applied. Each of the piston sides of those suspension cylinders may be connected to a suspension reservoir of a stop device which locks the suspension. An equalization device controls the piston side of the respective suspension cylinder. The generic spring suspension system is used for a suspension device between frame and axeltree of a vehicle. Two individual wheel beam supports of the axeltree are hinge-connected to the frame by a support element connected between the frame and each wheel beam support. Automatic level equalization for the vehicle is achieved with its spring suspension system. This adjustment may be referred to a central level. The level of a vehicle is understood to mean the position of the vehicle relative to the ground. The distance between a point of the vehicle frame and the ground indicates the level of the vehicle in approximation. Although the disclosed solution achieves an especially soft suspension in addition to the level adjustment, disruptive vehicle spring deflections occur under load, as indicated above.

DE-C-41 27 917 discloses a spring suspension system comprising a suspension reservoir with piston and rod sides. The rod side can also be connected to a suspension reservoir. As a type of suspension, a supporting force operates in the opposite direction by the suspension reservoir for the piston side as well as the rod side of the suspension cylinder. Even with this suspension system the disadvantages of the state of the art cannot be avoided.

SUMMARY OF THE INVENTION

Objects of the present invention are to provide an improved spring suspension system which eliminates the disadvantages described in conventional systems. The desired objects are basically achieved by a spring suspension system having an equalization device with an additional switching valve for control of the rod side of a suspension cylinder within the supply device. In a branch line, a load monitoring system is connected to a line with components of the locking device as well as to the associated suspension cylinder for the piston side of the suspension cylinder. The load monitoring system controls the pressure supply for the content of the required system pressure. By the equalization device, pressure equalization of the system can be affected on the currently prevailing load pressure before the spring suspension is reactivated. Hence, with the spring suspension system of the present invention, pressure equalization between the suspension cylinder and the associated suspension reservoir is effected. Thus, uncontrolled movement of the shaft is prevented when the suspension system is engaged, independently of the change in load.

In a preferred embodiment of the spring suspension system of the present invention, a sensor device monitors the current operating position of the actuating piston in the suspension cylinder. Even slight movement in the area of the suspension cylinder triggers pressure equalization independently of change in load.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
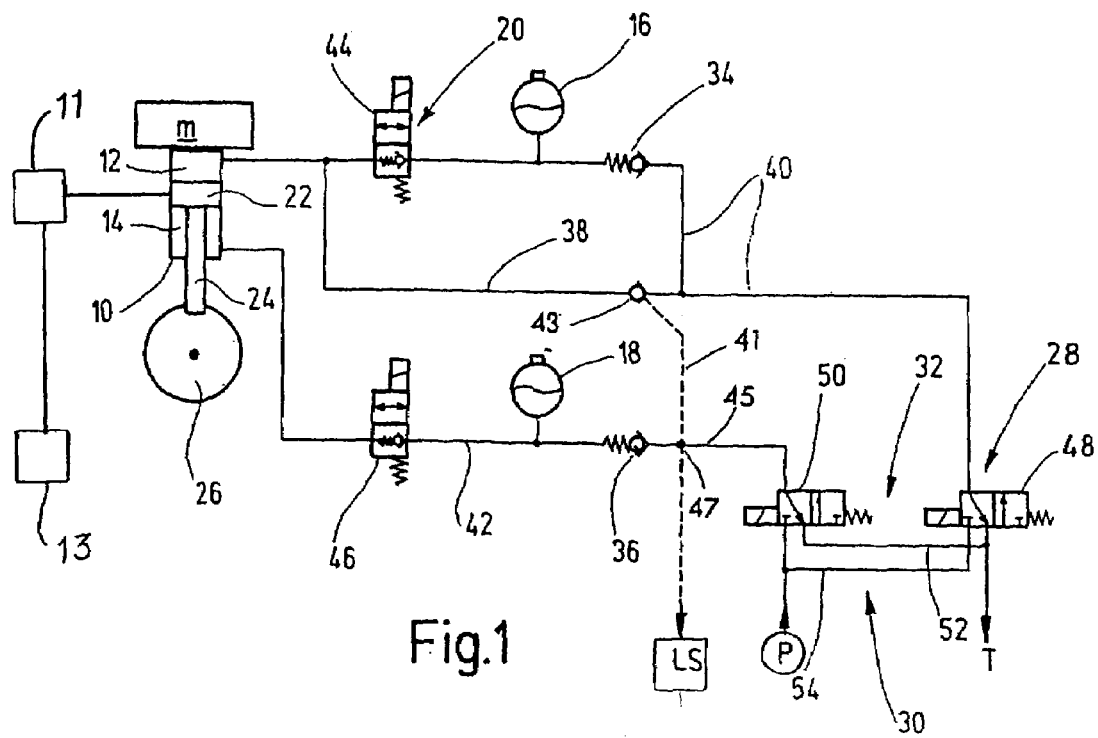
FIG. 1 is a diagrammatic illustration of a fluid circuit for a spring suspension system, according to an embodiment of the present invention in a first state of operation.

The spring suspension in FIG. 1 is shown in its locked state, that is, the suspension feature of the suspension system is disabled.

This spring suspension system has a suspension cylinder 10 to which varying load pressures m may be applied. The piston side 12 and piston rod side 14 may each be connected to a respective suspension reservoir 16 or 18 by a locking device 20. The locking device 20 locks the spring suspension in the switched state illustrated. The suspension cylinder 10 is connected by its housing to a vehicle body (not shown in detail), and is linked at the free end of the piston rod 24, connected to the piston 22, to a vehicle wheel 26. A plurality of vehicle wheels together with associated suspension cylinders (not shown) ensures operability of the machine, such as a tractor or the like. The spring suspension system also has an equalization device 28 which engages or disengages the cylinder with the aid of a supply device 30.

As FIG. 1 also shows, the two suspension reservoirs 16 and 18 are in the form of conventional hydraulic reservoirs or accumulators, such as membrane reservoirs or accumulators or the like. The locking device 20 is connected to supply device 30, which is to be regarded as part of the equalization device 28 and which ensures connection at option to a pressure supply source or pump P and/or to a tank connection T by a switching device 32. In addition, the two suspension reservoirs 16 and 18 are each separable from the supply device 30 by a non-return valve or one-way valve 34, 36, each of which is held in a closed position by a spring under load and move into their open positions in the direction of the relevant suspension reservoir 16 or 18.

A releasable non-return or one-way valve 43 is mounted in a branch line 38 of the line 40 leading to the locking device 20 of the suspension cylinder 10. Releasable non-return valve 43 is connected by control line 41 to load monitoring device LS of the supply device 30 and a line 45 between the non-return valve 36 and the 3-way, 2-position equalization switching valve 50. The fluid control connection for this purpose is made at connecting point 47. A response to the load sensing system may be made over the connection for this purpose so that the hydropump P supplying the system may assume system pressure. The releasable non-return valve 43 itself is connected between lines 38 and 40. In addition to the line 40 on the piston side, an additional line 42 is connected to suspension reservoir 18 and associated non-return valve 36 on the rod side 14 of the suspension cylinder 10.

The locking device 20 has both for the piston side 12 and for the rod side 14 of the suspension cylinder a respective 2-way, 2-position locking switching valve 44, 46. While in the inactive basic position shown in FIG. 1, each switching valve 44, 46 blocks the fluid conducting path from the suspension cylinder 10 toward the suspension reservoir 16, 18. Under spring loading, each switching valve 44, 46 opens the respective path in the other direction. In the locked position shown in FIG. 1, the suspension cylinder 10, with its piston side 12 and its rod side 14, is separated from the associated suspension reservoirs 16 and 18. Accordingly, the suspension system is locked so that spring deflection or rebound of the vehicle (not shown) is not possible. A change in load m cannot result in undesirable spring deflection or rebound of the total system.

The equalization device 28 has, both for the piston side 12 and for the rod side 14 of the suspension cylinder 10, within the supply device 30, a 3-way, 2-position equalization switching valve 48 or 50. In their unactuated initial positions these switching valves are connected to each other by a connecting line 52 to the tank connection T. On their admission or input side, these switching valves are additionally joined together by another connecting line 54 to conduct fluid. In addition, the suspension cylinder 10 has a sensor device 11 permitting monitoring of the position of the piston rod 24 and/or of the piston 22. This sensor device (shown only graphically) forwards its signals to a data interpretation unit 13 (shown only graphically), which in turn activates the switching valves 44, 46, 48, and 50 for an actuation process. Activation for the purpose of effecting pressure equalization prior to activation of the spring suspension will now be explained.

First of all, reference is made once again to the state of the system as illustrated FIG. 1. In the situation shown, the spring suspension is locked and the suspension cylinder 10 is in the level position. Deflection or rebound of the piston 22 with piston rod 24 is consequently not possible, since discharge of fluid on the piston side 12 or the rod side 14 is prevented by the switching valves 44, 46 being in their closed positions. In the locked position as shown, locking by switching valves 44, 46 is achieved in that the non-return valves integrated into them can open in the direction of the suspension cylinder 10, but are kept closed in the opposite direction, that is, in the direction of the suspension reservoir 16, 18. Increased pressure on the suspension reservoir 16, 18 side opens the switching valves 44, 46 even in their locked position in the direction of the suspension cylinder 10. If the load or load pressure m remains unchanged in the switching position shown in FIG. 1, the pressure on the piston side 12 corresponds to the fluid pressure of the piston suspension reservoir 16 and the fluid pressure on the rod side 14 corresponds to the fluid pressure of the rod suspension reservoir 18, the pressure on the rod side corresponding to the pressure of the system. To prevent, in this situation, uncontrolled movement of the vehicle wheel 26 and accordingly of the movable parts of the suspension cylinder 10 when the suspension is activated, pressure equalization must first be carried out between the suspension cylinder 10 and the suspension reservoirs 16, 18.

Figure 2:
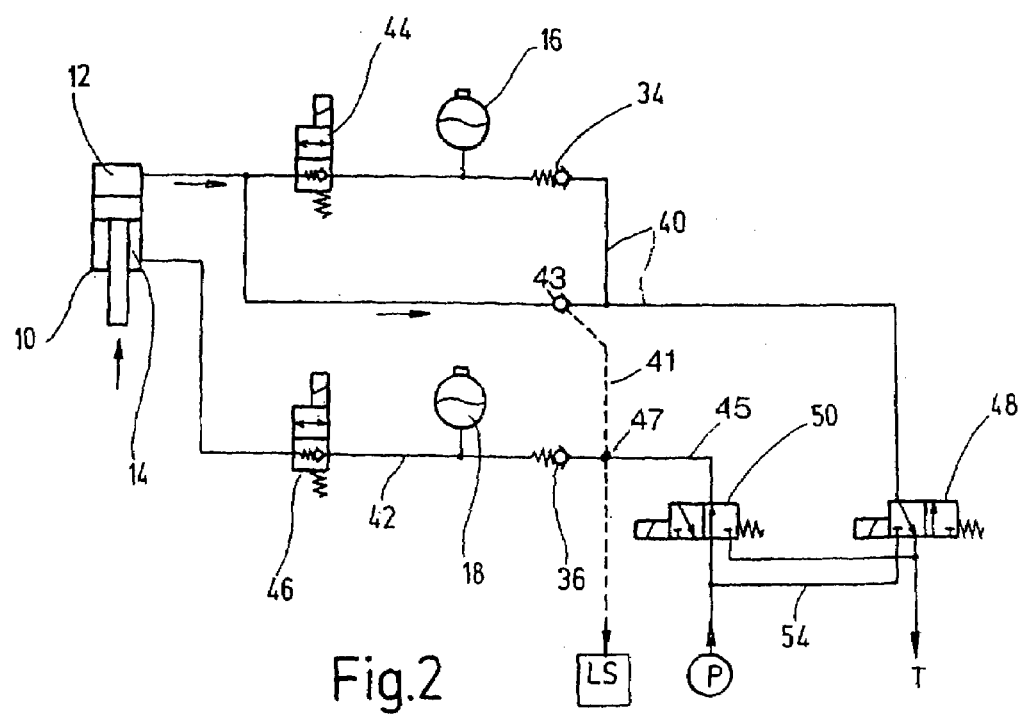
FIG. 2 is a diagrammatic illustration of the fluid circuit of FIG. 1 in a second state of operation.

To achieve this pressure equalization, in a first step, as illustrated in FIG. 2, the 3-way, 2-position rod equalization switching valve 50 is activated and the other line 42 is connected to the hydraulic pump P. Since the piston equalization switching valve 48 remains in its unactuated position as illustrated, the pump pressure is blocked by the switching valve 48 in the other connecting line 54 in the direction of the first line 40. If the pressure on the piston side 12 corresponds to the load pressure required, movement begins immediately on the suspension cylinder 10 and the piston 22 with piston rod 24 begins to travel in the direction of the piston side 12 of the suspension cylinder 10. The pressure in the piston suspension reservoir 16 may be even lower than the pressure on the piston side 12 of the suspension cylinder 10. In particular, the excess amount of fluid in movement for the purpose as indicated by the arrow from the piston side 12 is expelled in the direction of the side branch.

Figure 3:
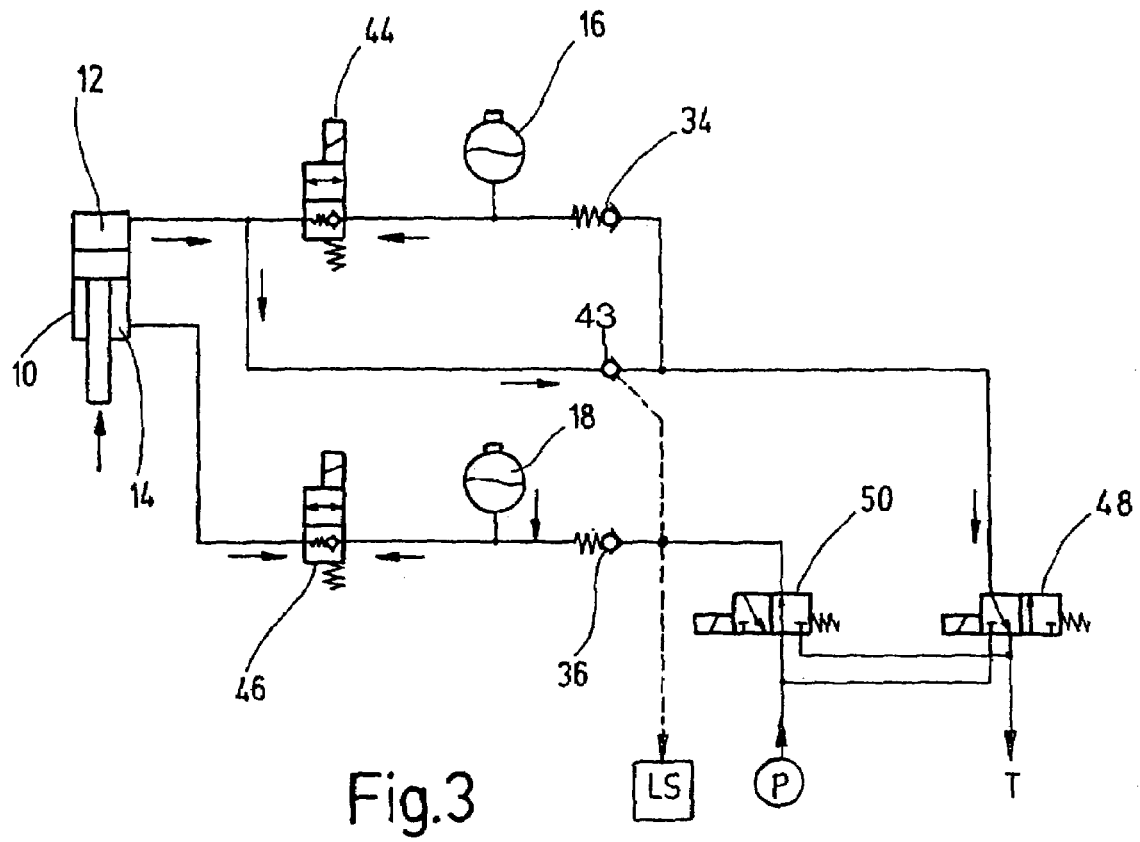
FIG. 3 is a diagrammatic illustration of the fluid circuit of FIG. 1 in a third state of operation.
Figure 4:
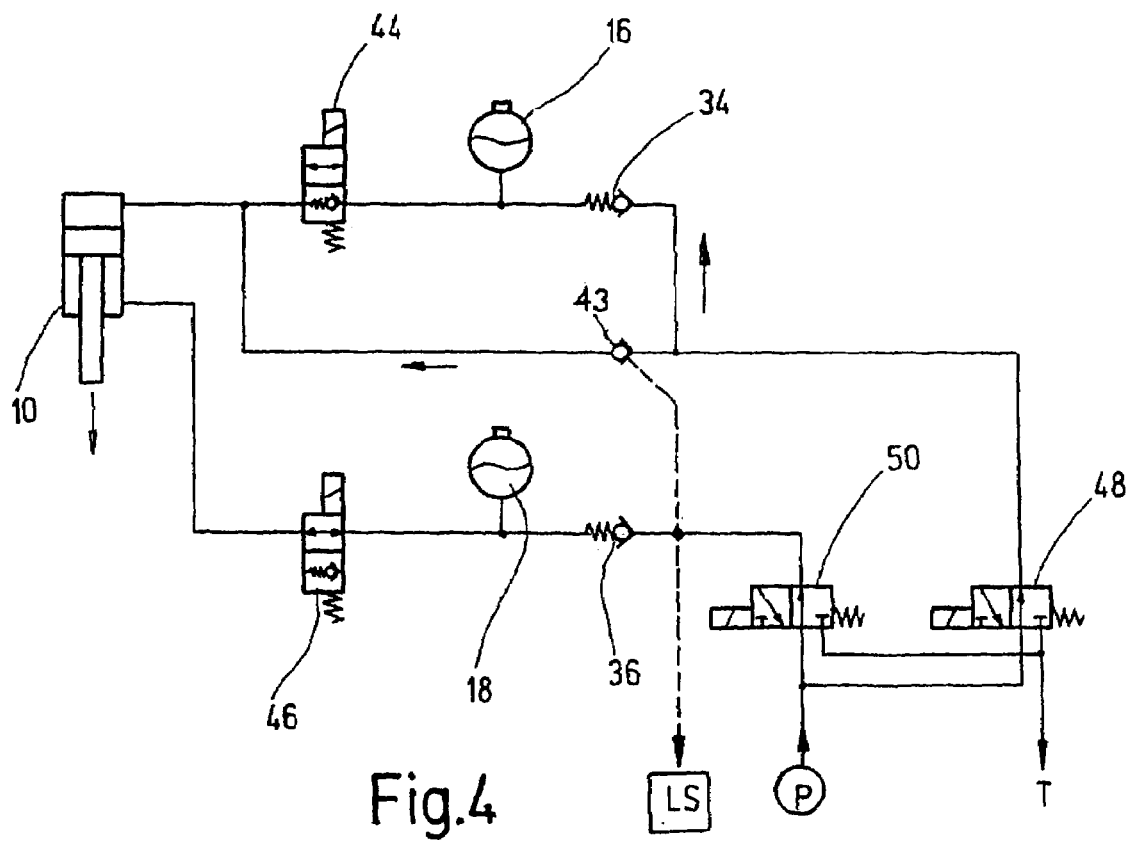
FIG. 4 is a diagrammatic illustration of the fluid circuit of FIG. 1 in a fourth state of operation.

If the pressure on the piston side 12 is above the required load pressure m, first fluid, especially hydraulic fluid, is drained from the piston suspension reservoir 16 by the 2-way, 2-position piston locking switching valve 44 as indicated by the arrow in FIG. 3 to the tank T, until the load pressure m has been reached. Once the load pressure has been reached, movement of the suspension cylinder 10 begins and the cylinder travels in the direction of the arrow. When the suspension cylinder starts to travel, hydraulic fluid is drawn from the associated rod suspension reservoir 18 on the ring or rod side 14 of the suspension cylinder 10. Pressure equalization is then established between cylinder pressure on the rod side 14 and reservoir pressure for the rod suspension reservoir 18 at system pressure. If the control system (sensor device 11 and data interpretation unit 13) detects movement at the system suspension cylinder 10, the first step toward pressure equalization has been completed. The pressure on the rod side 14 of the suspension cylinder 10 then corresponds to the storage pressure of the associated rod suspension reservoir 18, and both pressure values correspond to the system pressure. The rod locking switching valve 46 is subsequently actuated and then assumes a switch position as shown in FIG. 4.

The next or second step for pressure equalization involves switching of both the 3-way, 2-position rod switching valve 50 and the 3-way, 2-position piston switching valve 48 to the position allowing supply of pressure of line 40 or 42. In the switching state shown in FIG. 4 and achieved for this purpose, the piston 22 with piston rod 24 now emerges from the suspension cylinder 10 in the direction of the arrow. If the reservoir pressure of the piston suspension reservoir 16 now corresponds to the required load pressure m, movement at the suspension cylinder 10 begins immediately and the suspension cylinder 10 is extended. But if the reservoir pressure at the piston suspension reservoir 16 is initially lower than the required load pressure m, in a first step the suspension reservoir 16 is charged to load pressure by the associated return valve 34 in the line 40. If the load pressure has been reached, movement begins at the suspension cylinder 10 and the piston 22 with piston rod 24 is extended. Since the system of piston 22 and piston rod 24 rests on the unsprung mass which customarily may be in contact with the ground, extension of the system of piston 12 and piston rod 24 is equivalent to lifting of the sprung mass. In the case of the extension movement of the suspension cylinder 10 referred to, the pressure on the piston side 12 equals the pressure in the piston suspension reservoir 16, and this in turn equals the load pressure m. The control unit referred to above, consisting essentially of the sensor device and the data interpretation unit, detects the movement at the suspension cylinder 10 and the pressure equalization is then considered to be complete. Valves 48 and 50 in turn are shifted to their blocked position as shown in FIG. 1. After engagement of the 2-way, 2-position piston switching valve 44, as seen in FIG. 4, the spring suspension is open, that is, both the piston side 12 and the rod side 14 are connected to the suspension reservoirs 16 and 18 associated with them in a fluid conducting state for a spring suspension process.

Equalization of pressure between suspension cylinder 10 and the associated reservoirs 16, 18 is effected by the circuitry shown and the switching process described. With slight movement at the suspension cylinder in one direction or the direction opposite it, independently of possible change load m, uncontrolled movement is prevented when the suspension is engaged.

In an embodiment of the present invention not shown, the sprung masses may be replaced by unsprung masses. The circuitry of the suspension system is more or less retained, that is, the hydraulic components described remain connected as illustrated both to the piston and to the rod cavity of the suspension cylinder 10. The advantages referred to are retained as a result of the exchange made for the purpose. In another embodiment (not shown), it is also possible to detect the differential pressure present upstream and downstream from the switching valve 44 with conventional measurement devices. In the event that no differential pressure (permissible tolerance: minimum differential pressure) exists, the second step for pressure equalization as described in the foregoing may be dispensed with and accordingly the spring suspension may be released even more quickly.

Only the most important components of the spring suspension system of the present invention are shown in the illustrations. Corresponding throttles and return valves for damping of the system and the path-measuring system itself for measurement of movement of the state of the system at suspension cylinder 10 have been omitted from the circuit diagram. On the free end of the load monitoring device LS, a conventional variable capacity pump is mounted and controls the amount of fluids so that the level of the pressure reported by the load monitoring device LS is maintained. A closed control cycle is thereby obtained as a function of the pressure and load situation.

The invention claimed is:

1. A spring suspension for a working machine, comprising:
    a suspension cylinder subjected to varying load pressures and having a piston side and a rod side;
    piston side and rod side suspension reservoirs connectable to said piston side and said rod side, respectively;
    a locking device selectively connecting said piston and rod suspension reservoirs to said piston side and said rod side, respectively, and locking the suspension, said locking device having a piston locking switching valve with base position blocking fluid flow from said piston side to said piston side suspension reservoir and opening fluid flow to said piston side from said piston side suspension reservoir and having a rod locking switching valve with base position blocking fluid flow from said rod side to said rod side suspension reservoir and opening fluid flow to said rod side from said rod side suspension reservoir;
    a pressure supply to maintain required system pressure;
    an equalization device having a piston side equalization switching valve and a rod side equalization switching valve being part of a supply device selectively connecting said piston side and said rod side to said pressure supply to actuate said piston side and said rod side;
    a load monitoring unit connected to said locking device and said piston side suspension reservoir by a branch line and an opening control line with a openable non-return valve;
    piston and rod non-return valves spring biased to closed positions thereof in lines connecting said supply device to said piston and rod side suspension reservoirs, respectively, and opening against spring biasing in directions of the respective suspension reservoirs, each of said piston and rod, side suspension reservoirs being connected by lines to the respective side of said suspension cylinder between the respective locking switching valve and the respective non-return valve; and
    an openable valve in said branch line extending from a line between said piston locking switching valve and said piston side.

2. A spring suspension according to claim 1 wherein:
    said suspension reservoirs and said locking device are connected to said supply device as part of said equalization device, such that said equalization switching valves selectively provide connection to said pressure supply and a tank connection.

3. A spring suspension according to claim 2 wherein:
    each of said locking switching valves is a 2-way, 2-position valve.

4. A spring suspension according to claim 1 wherein:
    each of said locking switching valves is a 2-way, 2-position valve.

5. A spring suspension according to claim 1 wherein:
    said equalization switching valves are 3-way, 2-position valves having inoperative base positions connected to tank connections and being interconnected on input sides thereof to conduct fluid therebetween.

6. A spring suspension according to claim 5 wherein:
    an opening control line for said openable valve is connected to a line between said rod equalization switching valve and said rod non-return valve.

7. A spring suspension according to claim 6 wherein:
    said openable valve is a non-return valve.

8. A spring suspension according to claim 6 wherein:
    a sensor device monitors positions of a piston rod in said suspension cylinder and transmits signals to an interpretation unit which activates said switching valves.

9. A spring suspension according to claim 5 wherein:
    a sensor device monitors positions of a piston rod in said suspension cylinder and transmits signals to an interpretation unit which activates said switching valves.

* * * * *